US006282055B1

United States Patent
Lakshmikumaran et al.

(10) Patent No.: US 6,282,055 B1
(45) Date of Patent: Aug. 28, 2001

(54) MAGNETIC TAPE HEAD WITH COMBINATION BLEED AND TRANSVERSE SLOTTED CONTOUR

(75) Inventors: Anand V. Lakshmikumaran, North Glenn; Terry J. Barber, Louisville, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/434,199

(22) Filed: Nov. 4, 1999

(51) Int. Cl.[7] .......................... G11B 5/187; G11B 5/265
(52) U.S. Cl. ............................ 360/122; 360/121
(58) Field of Search ........................ 360/122, 121, 360/221

(56) References Cited

U.S. PATENT DOCUMENTS 3,872,507 * 3/1975 Sano et al. ..................... 360/102
6,038,108 * 3/2000 Dee et al. ...................... 360/121

* cited by examiner

*Primary Examiner*—Robert S. Tupper
(74) *Attorney, Agent, or Firm*—Brooks & Kushman P.C.

(57) ABSTRACT

A magnetic tape head assembly for use with a moveable magnetic tape includes an interior tape head module having an interior magnetic gap, and first and second transverse slots disposed on opposite sides of the interior magnetic gap. Each of the transverse slots has inner and outer edges, and the interior module further has first and second slotted regions disposed proximate the outer edges of the first and second transverse slots, respectively. The assembly further includes first and second exterior tape head modules disposed adjacent opposite sides of the interior module. The first exterior module has a first magnetic gap, third and fourth transverse slots disposed on opposite sides of the first magnetic gap such that the fourth transverse slot is disposed between the first magnetic gap and the interior module, and a third slotted region disposed between the fourth transverse slot and the interior module. The second exterior module has a second magnetic gap, fifth and sixth transverse slots disposed on opposite sides of the second magnetic gap such that the fifth transverse slot is disposed between the second magnetic gap and the interior module, and a fourth slotted region disposed between the fifth transverse slot and the interior module. The transverse slots and the slotted regions cooperate to remove air entrained between the assembly and the tape as the tape moves over the assembly.

39 Claims, 4 Drawing Sheets

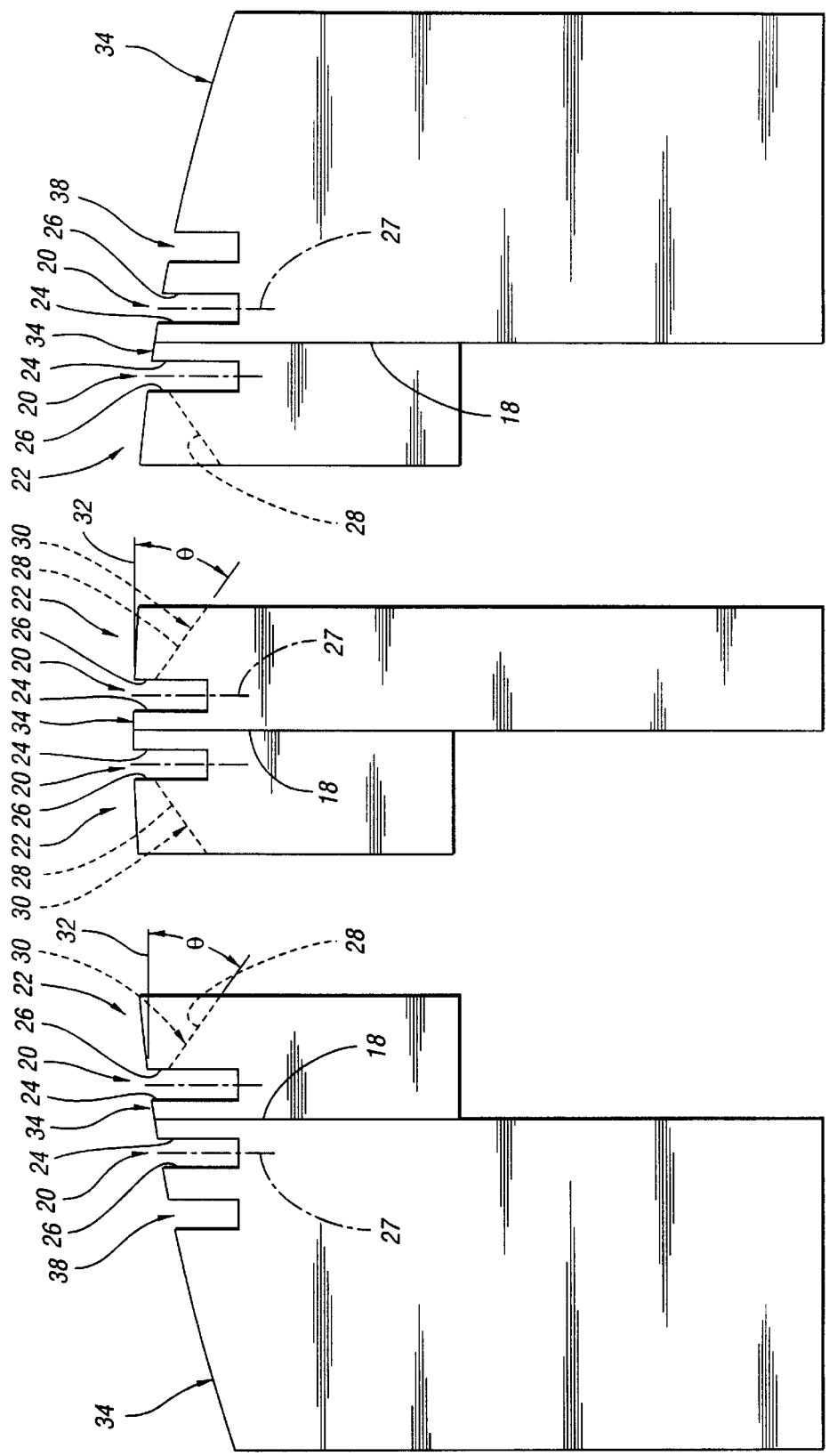

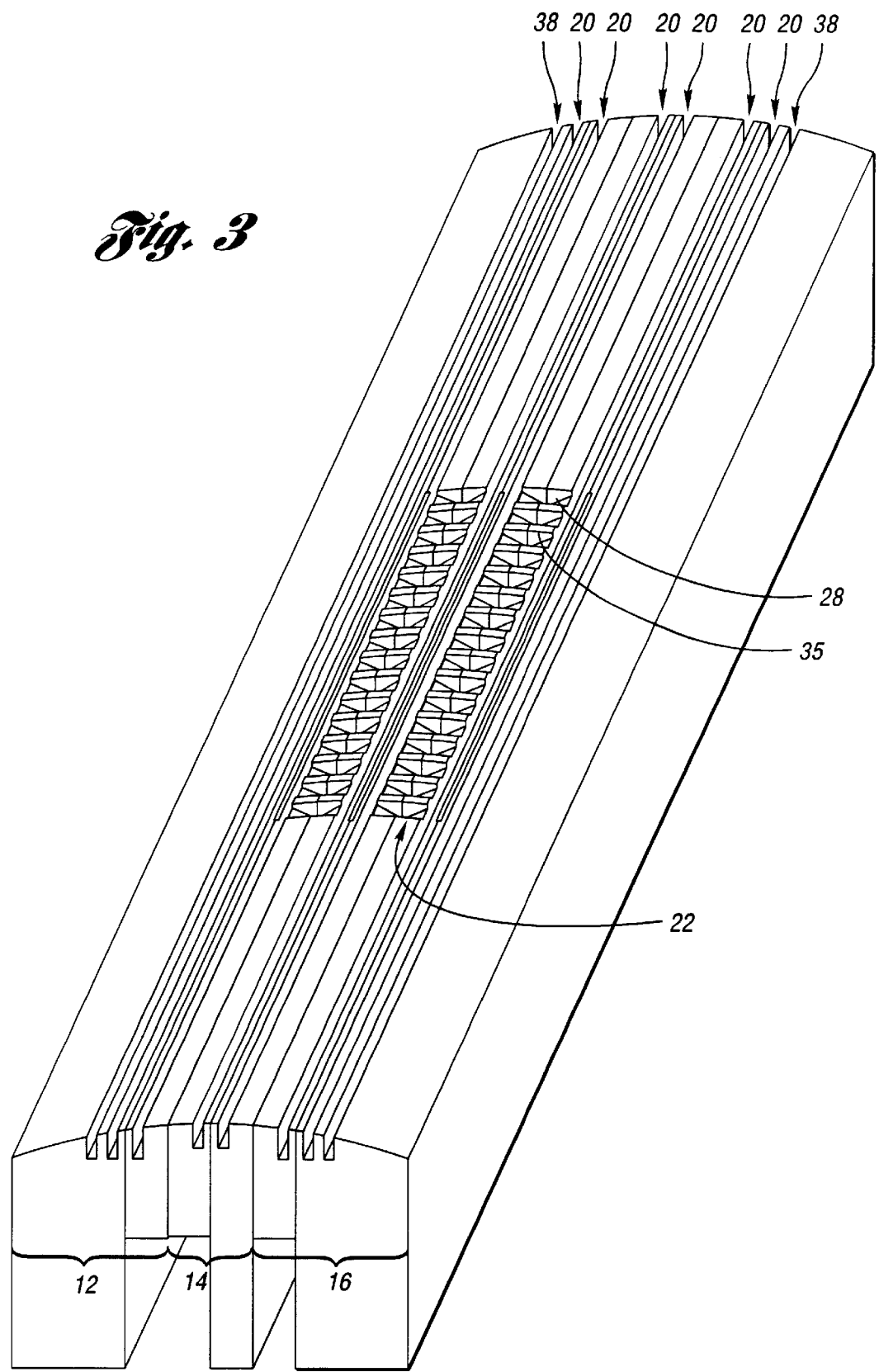

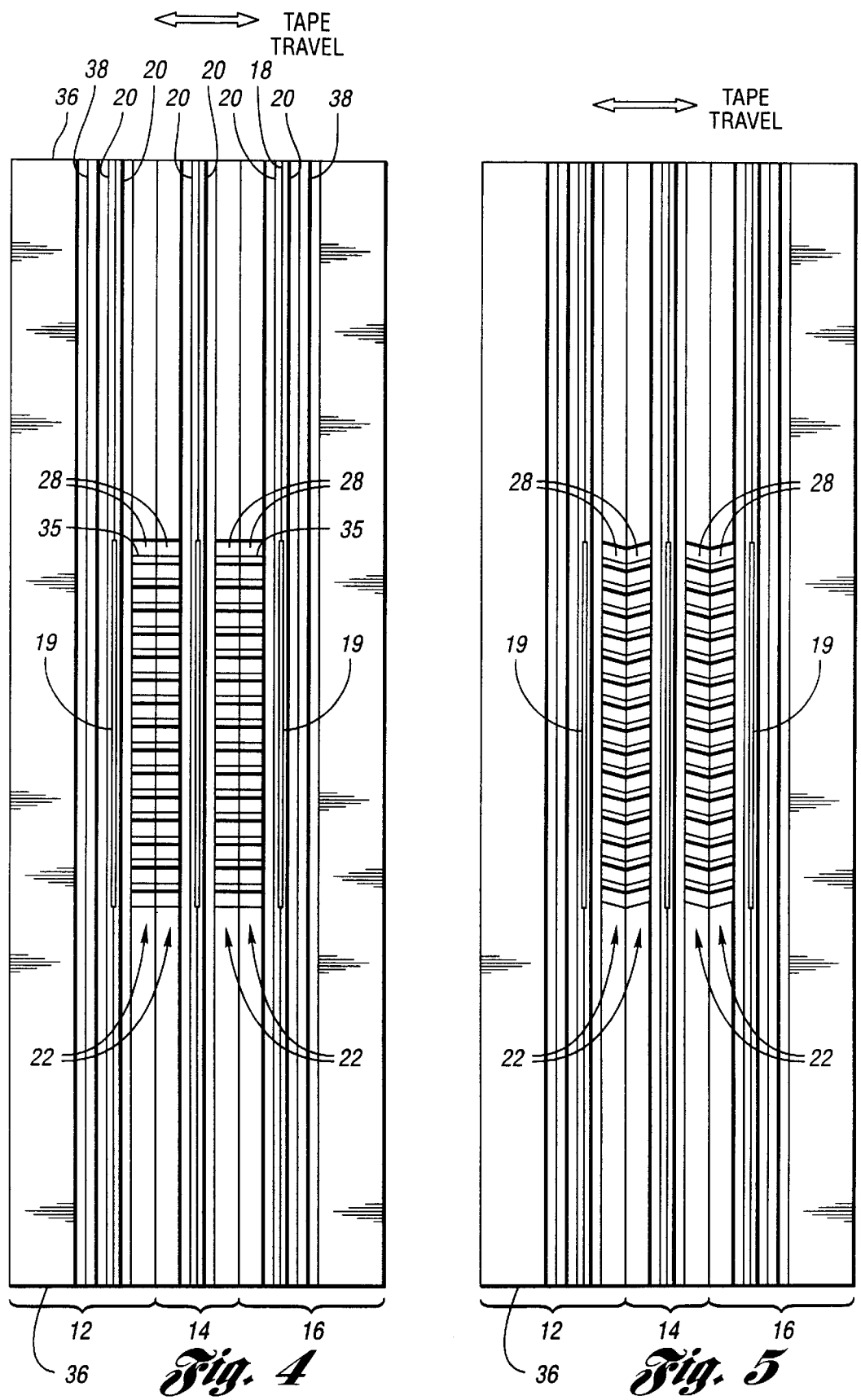

MAGNETIC TAPE HEAD WITH COMBINATION BLEED AND TRANSVERSE SLOTTED CONTOUR

TECHNICAL FIELD

The present invention relates to a magnetic tape head having a contour that includes multiple bleed slots and multiple transverse slots.

BACKGROUND ART

An important and continuing goal in the data storage industry is that of increasing the density of data stored on a medium. For magnetic tape storage systems, that goal has lead to increasing track density in recording heads, and decreasing the thickness of the tape in order to increase the quantity of tape stored on a tape cartridge. The development of small footprint, higher performance tape drive systems, however, has created various problems in the design of a tape head contour for use in such systems.

First, data storage efficiency can be reduced by entrained air that causes separation between a magnetic tape and a recording head as the tape moves over the head. Such separation losses can be reduced by providing bleed slots in the head that extend in the direction of tape travel. However, at higher tape speeds and with thinner tapes, air can still become entrained between the tape and slot islands located between adjacent bleed slots, thereby causing separation losses and a degradation of performance.

Moreover, for higher tape speeds, the bleed slots must be made wider, and the slot islands therefore narrower, in order to account for increased entrained air. The narrower the slot islands, the more difficult they are to manufacture and the more prone they are to breakage.

U.S. Pat. No. 5,953,184, which is assigned to the assignee of the present invention, discloses a magnetic tape head that includes an interior tape head module sandwiched between two exterior tape head modules. Each of the modules has a magnetic gap and a transverse slot on each side of the magnetic gap for removing entrained air.

DISCLOSURE OF INVENTION

The invention provides a magnetic tape head having a contour that includes multiple bleed slots in combination with multiple transverse slots to effectively reduce separation losses.

Under the invention, a magnetic tape head for use with a moveable magnetic tape includes a magnetic gap, and first and second transverse slots disposed on opposite sides of the magnetic gap. Each transverse slot extends transversely of the direction of motion of the tape and has inner and outer edges. The head further includes first and second slotted regions disposed proximate the outer edges of the first and second transverse slots, respectively. Each slotted region includes a plurality of bleed slots extending in a direction non-perpendicular to the direction of motion of the tape. The transverse slots and the slotted regions cooperate to remove air entrained between the head and the tape as the tape moves over the head.

Preferably, the bleed slots of the first and second slotted regions are in fluid communication with the first and second transverse slots, respectively. Such a configuration maximizes removal of entrained air.

In one embodiment of the invention, each bleed slot has a breakout point that is less than 0.0115 inches from the magnetic gap. Furthermore, each bleed slot preferably has a breakout point that is less than 0.007 inches from the magnetic gap.

The magnetic gap of the head may include an active element region having a lateral dimension that is less than a lateral dimension of the head. Each slotted region preferably extends only along the lateral dimension of the active element region. Advantageously, with such a configuration, damage to edges of the tape may be substantially reduced or eliminated as the head is moved laterally across the tape for track following purposes.

These and other objects, features and advantages of the invention will be readily apparent from the following detailed description of the best modes for carrying out the invention when taken in conjunction with the accompanying drawings.

BRIEF DESCRIPTION OF DRAWINGS

FIG. 2 is an exploded side view of the tape head assembly;

FIG. 3 is a perspective view of the tape head assembly showing the bleed slots in fluid communication with the transverse slots;

FIG. 4 is a top view of the tape head assembly; and

FIG. 5 is a top view of the tape head assembly similar to FIG. 4 and showing an alternative configuration of the bleed slots.

BEST MODE FOR CARRYING OUT THE INVENTION

Figure 1:
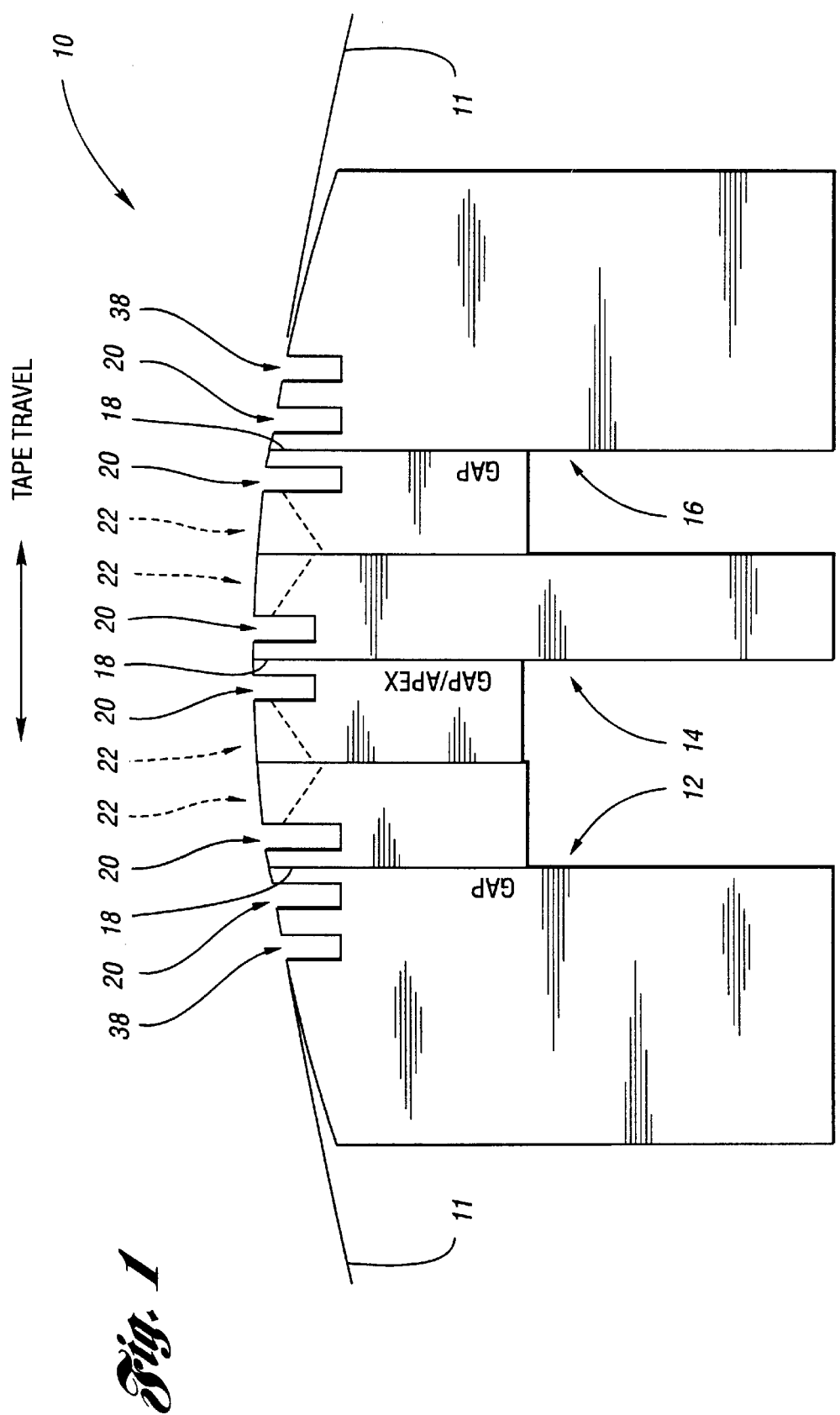
FIG. 1 is a side view of an exemplary tape head assembly according to the invention and including a contour having multiple transverse slots and multiple bleed slots.

FIGS. 1 through 4 show an exemplary embodiment of a tape head assembly 10 according to the invention. As will be described in greater detail below, tape head assembly 10 includes various features that combine to create a robust, high performance bi-directional tape head contour for receiving a tape 11 thereon. The direction of tape travel is denoted by the arrows labeled "TAPE TRAVEL".

Tape head assembly 10 comprises three tape head modules 12, 14 and 16, including interior module 14 and exterior modules 12 and 16. The exterior modules 12 and 16 are preferably wider than the interior module 14 to account for variations in tape wrap angle. Specifically, exterior modules 12 and 16 are preferably 0.105 inches wide, while interior module 14 is preferably 0.060 inches wide. Furthermore, each module 12, 14 and 16 preferably has a radius of curvature of approximately 0.390 inches.

Each module 12, 14 and 16 further has a magnetic gap 18, and each magnetic gap 18 may contain one or more active elements, such as read elements and write elements, disposed in an active element region 19. Therefore, tape head assembly 10 may be constructed with various read and write configurations. However, tape head assembly 10 is preferably a "read-write-read" assembly. That is, exterior module 12 preferably comprises a read element, interior module 14 comprises a write element, and exterior module 16 comprises a read element. Furthermore, each active element region 19 preferably has a lateral dimension that is less than a lateral dimension of a respective module 12, 14 or 16. The apex or highest point of interior module 14 is located at the gap 18 of interior module 14, while the apex of each exterior module 12 and 16 is located at a distance of 0.030 inches from the module's respective gap 18 toward interior module 14.

As the widths of the active elements decrease, the spacing between gaps 18 of modules 12, 14 and 16 must be reduced to prevent azimuth alignment errors. In the embodiment depicted in FIGS. 1 through 4, the spacing between gaps 18 is preferably 0.060 inches. With such spacing between adjacent gaps 18, bleed slots alone cannot be provided with sufficient length to adequately eliminate entrained air, particularly at higher tape speeds and with use of thinner tape 11. Furthermore, bleed slots alone are not sufficient because bleed slots induce non-uniform head/tape spacing across the width of the tape 11. There is also insufficient land to provide multiple transverse slots on each of the modules 12, 14 and 16 between adjacent gaps 18.

To solve this problem, as seen in FIGS. 1–4, the contour of each module 12, 14 and 16 is provided with one transverse slot 20 on each side of the module's respective gap 18, and a slotted region 22 disposed between adjacent gaps 18. Because the slotted regions 22 and transverse slots 20 can be provided with any suitable spacing therebetween, or no spacing at all, such an arrangement is particularly useful with multi-gap tape heads having relatively small gap-to-gap spacing requirements.

Each transverse slot 20 has inner and outer edges 24 and 26, respectively. Each transverse slot 20 also preferably has a width in the direction of tape travel of 0.007 inches, and a depth of at least 0.015 inches. Furthermore, each transverse slot 20 of each module 12, 14 and 16 has a centerline 27 that is preferably located 0.008 inches from the module's respective gap 18.

The slotted regions 22 are preferably disposed along the outer edges 26 of the transverse slots 20, and each slotted region 22 has a plurality of bleed slots 28 that are preferably in fluid communication with a respective transverse slot 20. Alternatively, the slotted regions 22 may be spaced away from the outer edges 26 of the transverse slots 20. Furthermore, each of the slotted regions 22 preferably extends laterally only along the lateral dimension of a respective active element region 19. With such a configuration, damage to edges of the tape 11 may be substantially reduced or eliminated as the tape head assembly 10 is moved laterally across the tape 11.

Each bleed slot 28 has a bottom surface 30 that defines a slot-angle $\Theta$ with respect to a horizontal line 32. While $\Theta$ may be in the range of 0 to 90°, $\Theta$ is preferably 35°. Because each bleed slot 28 is preferably in fluid communication with a respective transverse slot 20, each bottom surface 30 may not extend to an arcuate surface 34 of the tape head assembly 10 over which the tape 11 travels. In other words, each bleed slot 28 may not have an actual breakout point, or point at which a respective bottom surface 30 breaks through or contacts the arcuate surface 34. Nonetheless, a line coincident with the bottom surface 30 of each bleed slot 28 may be extended to an arc joining adjacent portions of the arcuate surface 34 to define an imaginary breakout point. As used herein, the term "breakout point" shall refer to an actual breakout point or an imaginary breakout point. Given this definition of breakout point, each bleed slot 28 preferably has a breakout point that is at or near the inner edge 24 of a respective transverse slot 20. More specifically, each bleed slot 28 of each module 12, 14 and 16 preferably has a breakout point that is approximately 0.0045 to 0.0065 inches from the module's respective gap 18.

As shown in FIG. 4, the bleed slots 28 in each slotted region 22 are separated by islands 35. Each bleed slot 28 preferably has a width of 0.0107 inches, and each island 35 preferably has a width of 0.0055 inches. Furthermore, the bleed slots 28 disposed at opposite ends of each slotted region 22 have centerlines that are preferably located 0.287 inches from opposite lateral sides 36 of the tape head assembly 10.

As further shown in FIG. 4, each bleed slot 28 preferably extends in the direction of tape travel for ease of manufacture. In other words, each bleed slot 28 preferably extends at an angle of 0° with respect to the direction of tape travel. Alternatively, one or more bleed slots 28 may extend in a direction nonperpendicular to the direction of tape travel. In other words, each of the bleed slots 28 may extend at an angle between +90° and −90° with respect to the direction of tape travel. If the bleed slots 28 extend at a angles other than 0°, the bleed slots 28 are able to remove air along the length of the tape 11, as well as across the tape 11. Consequently, air removal will be maximized and non-uniform tape/head spacing will be minimized. As shown in FIG. 5, the bleed slots 28 of adjacent slotted regions 22 may also extend in different directions with respect to the direction of tape travel.

Returning to FIGS. 1 through 4, each exterior module 12 and 16 is preferably provided with an additional transverse slot 38 disposed between each module's respective gap 18 and an outer side of the tape head assembly 10. In addition to removing entrained air, the transverse slots 38 also function to trap debris from the surface of the tape as the tape travels over the tape head assembly 10. Because the exterior modules 12 and 16 are wider than the interior module 14, additional space is available to accommodate the transverse slots 38.

Each transverse slot 38 of each exterior module 12 and 16 has a centerline that is preferably located 0.022 inches from the module's respective gap 18. Furthermore, each transverse slot 38 also preferably has a width in the direction of tape travel of 0.007 inches, and a depth of at least 0.015 inches.

While the locations and dimensions of transverse slots 20 and 38 and slotted regions 22 detailed above are preferable, other locations and dimensions may also be used. Moreover, additional slotted regions (not shown) may also be provided on exterior modules 12 and 16 outside of transverse slots 38, or in lieu of transverse slots 38.

In order for the transverse slots 20 and 38 to adequately remove entrained air, the transverse slots 20 and 38 should be covered by the tape 11 when the tape 11 is stationary. Therefore, the preferred locations of stationary tangent points of the tape 11 on each of the modules 12, 14 and 16, such that transverse slots 20 may adequately function to defeat entrained air and debris, are each greater than 0.0115 inches from the module's respective gap 18, and preferably in the range of 0.022 to 0.023 inches from the module's respective gap 18. In addition, the preferred location of a stationary tangent point of the tape 11 on each exterior module 12 and 16 where the tape 11 first comes into contact with the tape head assembly 10, such that transverse slots 38 may adequately function to defeat entrained air and debris, is greater than 0.0255 inches from the module's respective gap 18, and preferably in the range of 0.045 to 0.049 inches from the module's respective gap 18.

Advantageously, because the bleed slots 28 are preferably in fluid communication with the transverse slots 20, the preferred tangent point locations of the tape 11 with respect to the transverse slots 20 also satisfy minimum coverage or engagement points of the bleed slots 28, wherein minimum engagement points are measured from the breakout points of the bleed slots 28. At the minimum engagement point for a particular bleed slot 28, the depth of the bleed slot 28 in a direction perpendicular to a tangent plane of the tape 11, and with respect to an adjacent island 35, should be at least ten times the thickness of the tape 11. With the preferred configuration of the tape head assembly 10, the minimum engagement point for each bleed slot 28 is approximately 0.004 inches from the bleed slot's breakout point. Thus, the minimum engagement point for each bleed slot 28 preferably falls within a respective transverse slot 20.

Because the bleed slots 28 do not require any additional coverage by the tape 11 when the tape 11 is stationary, the tape head assembly 10 is able to effectively maximize removal of entrained air while minimizing gap-to-gap spacing. Furthermore, because the bleed slots 28 are preferably located along the outer edges 26 of the transverse slots 20, any non-uniform spacing introduced by the bleed slots 28 may be eliminated by the transverse slots 20 before the tape 11 passes over the gaps 18.

It should be noted that the contour of tape head assembly 10 may be manufactured with existing wafer, machining, and assembly processes. Preferably, the bleed slots 28 are formed first by machining each module 12, 14 and 16. Next, the transverse slots 20 and 38 may be formed such that the bleed slots 28 are in fluid communication with the transverse slots 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A magnetic tape head for use with a moveable magnetic tape, the head comprising:
    a magnetic gap;
    first and second transverse slots disposed on opposite sides of the magnetic gap, each transverse slot extending transversely of the direction of motion of the tape and having inner and outer edges; and
    first and second slotted regions disposed proximate the outer edges of the first and second transverse slots, respectively, each slotted region including a plurality of bleed slots, each bleed slot extending in a direction non-perpendicular to the direction of motion of the tape;
    wherein each bleed slot of the first slotted region has a breakout point that is less than 0.0115 inches from the magnetic gap.

2. The magnetic tape head of claim 1 wherein the bleed slots of the first and second slotted regions are in fluid communication with the first and second transverse slots, respectively.

3. The magnetic tape head of claim 2 wherein each bleed slot of the second slotted region has a breakout point that is less than 0.0115 inches from the magnetic gap.

4. The magnetic tape head of claim 2 wherein each bleed slot has a breakout point that is less than 0.007 inches from the magnetic gap.

5. The magnetic tape head of claim 1 wherein each bleed slot has a slot-angle of approximately 35 degrees with respect to a horizontal line.

6. The magnetic tape head of claim 1 wherein the bleed slots extend in the direction of motion of the tape.

7. The magnetic tape head of claim 1 wherein the magnetic gap has an active element region having a lateral dimension that is less than a lateral dimension of the head, and wherein each slotted region does not extend laterally beyond the lateral dimension of the active element region.

8. A magnetic tape head assembly for use with a moveable magnetic tape, the magnetic tape head assembly comprising:
    an interior tape head module having an interior magnetic gap, first and second sides defining a width, and first and second transverse slots disposed on opposite sides of the interior magnetic gap, each of the transverse slots having inner and outer edges, the interior module further having first and second slotted regions disposed proximate the outer edges of the first and second transverse slots, respectively;
    a first exterior tape head module disposed adjacent the first side of the interior module and having a first magnetic gap, third and fourth transverse slots disposed on opposite sides of the first magnetic gap such that the fourth transverse slot is disposed between the first magnetic gap and the interior module, and a third slotted region disposed between the fourth transverse slot and the interior module; and
    a second exterior tape head module disposed adjacent the second side of the interior module and having a second magnetic gap, fifth and sixth transverse slots disposed on opposite sides of the second magnetic gap such that the fifth transverse slot is disposed between the second magnetic gap and the interior module, and a fourth slotted region disposed between the fifth transverse slot and the interior module;
    wherein the transverse slots extend transversely of the direction of motion of the tape, the slotted regions each include a plurality of bleed slots, each bleed slot extends in a direction non-perpendicular to the direction of motion of the tape, each bleed slot has a breakout point that is less than 0.0115 inches from the interior magnetic gap, and the transverse slots and the slotted regions cooperate to remove air entrained between the assembly and the tape as the tape moves over the assembly.

9. The magnetic tape head assembly of claim 8 wherein the bleed slots of the first and second slotted regions are in fluid communication with the first and second transverse slots, respectively.

10. The magnetic tape head assembly of claim 9 wherein each bleed slot of the first and second slotted regions has a breakout point that is less than 0.007 inches from the interior magnetic gap.

11. The magnetic tape head assembly of claim 8 wherein each bleed slot has a slot-angle of approximately 35 degrees with respect to a horizontal line.

12. The magnetic tape head assembly of claim 8 wherein the bleed slots of the third slotted region are in fluid communication with the fourth transverse slot.

13. The magnetic tape head assembly of claim 12 wherein the bleed slots of the fourth slotted region are in fluid communication with the fifth transverse slot.

14. The magnetic tape head assembly of claim 13 wherein each bleed slot of the third slotted region has a breakout point that is less than 0.0115 inches from the first magnetic gap, and each bleed slot of the fourth slotted region has a breakout point that is less than 0.0115 inches from the second magnetic gap.

15. The magnetic tape head assembly of claim 13 wherein each bleed slot of the third slotted region has a breakout point that is less than 0.007 inches from the first magnetic gap, and each bleed slot of the fourth slotted region has a breakout point that is less than 0.007 inches from the second magnetic gap.

16. The magnetic tape head assembly of claim 8 wherein the bleed slots extend in the direction of motion of the tape.

17. The magnetic tape head assembly of claim 8 wherein each magnetic gap has an active element region having a lateral dimension that is less than a lateral dimension of a respective module, wherein each slotted region does not extend laterally beyond the lateral dimension of a respective active element region.

18. The magnetic tape head assembly of claim 8 wherein the first exterior module includes an additional transverse slot disposed proximate the third transverse slot, and the second exterior module includes an additional transverse slot disposed proximate the sixth transverse slot.

19. The magnetic tape head assembly of claim 8 wherein each bleed slot has a slot angle of approximately 35 degrees with respect to a horizontal line.

20. A magnetic tape head assembly for use with a moveable magnetic tape, the magnetic tape head assembly comprising:

at least one interior tape head module having an interior magnetic gap, first and second sides defining a width extending in the direction of motion of the tape, first and second transverse slots disposed on opposite sides of the interior magnetic gap, and first and second slotted regions in fluid communication with the first and second transverse slots, respectively, each of the transverse slots extending transversely of the direction of motion of the tape and having inner and outer edges, the slotted regions being disposed along the outer edges of the transverse slots;

a first exterior tape head module having a first magnetic gap and third and fourth sides defining a width extending in the direction of motion of the tape and greater than the width of at least one of the at least one interior module, wherein the fourth side is disposed adjacent the first side of one of the at least one interior module, the first exterior module further having third and fourth transverse slots disposed between the third side and the first magnetic gap, a fifth transverse slot disposed between the first magnetic gap and the interior magnetic gap, and a third slotted region in fluid communication with the fifth transverse slot, each of the transverse slots extending transversely of the direction of motion of the tape and having inner and outer edges, the third slotted region being disposed along the outer edge of the fifth transverse slot and including a plurality of bleed slots extending in the direction of motion of the tape; and a second exterior tape head module having a second magnetic gap and fifth and sixth sides defining a width extending in the direction of motion of the tape and greater than the width of at least one of the at least one interior module, wherein the fifth side is disposed adjacent the second side of one of the at least one interior module, the second exterior module further having a sixth transverse slot disposed between the second magnetic gap and the interior magnetic gap, seventh and eighth transverse slots disposed between the second magnetic gap and the sixth side, and a fourth slotted region in fluid communication with the sixth transverse slot, each of the transverse slots extending transversely of the direction of motion of the tape and having inner and outer edges, the fourth slotted region being disposed along the outer edge of the sixth transverse slot and including a plurality of bleed slots extending in the direction of motion of the tape.

21. The magnetic tape head assembly of claim 20 wherein each bleed slot has a breakout point that is less than 0.007 inches from a respective magnetic gap.

22. A magnetic tape head for use with a moveable magnetic tape, the head comprising:

a magnetic gap;

first and second transverse slots disposed on opposite sides of the magnetic gap, each transverse slot extending transversely of the direction of motion of the tape and having inner and outer edges; and first and second slotted regions disposed proximate the outer edges of the first and second transverse slots, respectively, each slotted region including a plurality of bleed slots, each bleed slot extending in a direction non-perpendicular to the direction of motion of the tape, each bleed slot further having a slot-angle of at least 35 degrees with respect to a horizontal line.

23. The magnetic tape head of claim 22 wherein the bleed slots of the first and second slotted regions are in fluid communication with the first and second transverse slots, respectively, and each bleed slot has a breakout point that is less than 0.0115 inches from the magnetic gap.

24. The magnetic tape head of claim 22 wherein the bleed slots of the first and second slotted regions are in fluid communication with the first and second transverse slots, respectively, and each bleed slot has a breakout point that is less than 0.007 inches from the magnetic gap.

25. The magnetic tape head of claim 22 wherein the bleed slots of the first slotted region extend in a first direction non-parallel to the direction of motion of the tape.

26. The magnetic tape head of claim 25 wherein the bleed slots of the second slotted region extend in a second direction non-parallel to the direction of motion of the tape.

27. The magnetic tape head of claim 26 wherein the second direction is different than the first direction.

28. The magnetic tape head of claim 22 wherein the magnetic gap has an active element region having a lateral dimension that is less than a lateral dimension of the head, and wherein each slotted region does not extend laterally beyond the lateral dimension of the active element region.

29. A magnetic tape head for use with a moveable magnetic tape, the head comprising:

a magnetic gap including an active element region having a lateral dimension that is less than a lateral dimension of the head;

first and second transverse slots disposed on opposite sides of the magnetic gap, each transverse slot extending transversely of the direction of motion of the tape and having inner and outer edges; and first and second slotted regions disposed proximate the outer edges of the first and second transverse slots, respectively, each slotted region including a plurality of bleed slots, each bleed slot extending in a direction non-perpendicular to the direction of motion of the tape, wherein each slotted region does not extend laterally beyond the lateral dimension of the active element region.

30. The magnetic tape head of claim 29 wherein the bleed slots of the first and second slotted regions are in fluid communication with the first and second transverse slots, respectively, and each bleed slot has a breakout point that is less than 0.0115 inches from the magnetic gap.

31. The magnetic tape head of claim 29 wherein the bleed slots of the first and second slotted regions are in fluid communication with the first and second transverse slots, respectively, and each bleed slot has a breakout point that is less than 0.007 inches from the magnetic gap.

32. The magnetic tape head of claim 29 wherein the bleed slots of the first slotted region extend in a first direction non-parallel to the direction of motion of the tape.

33. The magnetic tape head of claim 32 wherein the bleed slots of the second slotted region extend in a second direction non-parallel to the direction of motion of the tape.

34. The magnetic tape head of claim 33 wherein the second direction is different than the first direction.

35. A magnetic tape head for use with a moveable magnetic tape, the head comprising:

a magnetic gap;

first and second transverse slots disposed on opposite sides of the magnetic gap, each transverse slot extending transversely of the direction of motion of the tape and having inner and outer edges; and first and second slotted regions disposed proximate the outer edges of the first and second transverse slots, respectively, each slotted region including a plurality of bleed slots, each bleed slot of the first slotted region extending in a direction non-parallel and non-perpendicular to the direction of motion of the tape.

36. The magnetic tape head of claim 35 wherein each bleed slot of the second slotted region extends in a direction non-parallel and non-perpendicular to the direction of motion of the tape.

37. The magnetic tape head of claim 36 where the bleed slots of the first slotted region extend in a first direction, and the bleed slots of the second slotted region extend in a second direction different than the first direction.

38. The magnetic tape head of claim 35 wherein the bleed slots of the first and second slotted regions are in fluid communication with the first and second transverse slots, respectively, and each bleed slot has a breakout point that is less than 0.0115 inches from the magnetic gap.

39. The magnetic tape head of claim 35 wherein the bleed slots of the first and second slotted regions are in fluid communication with the first and second transverse slots, respectively, and each bleed slot has a breakout point that is less than 0.007 inches from the magnetic gap.

* * * * *